United States Patent [19]

Kogure et al.

[11] 4,245,265

[45] Jan. 13, 1981

[54] AUTOMATIC TAPE BIAS ADJUSTING AND SIGNAL COMPENSATION RECORDING AND REPRODUCING APPARATUS

[75] Inventors: Takuyo Kogure, Neyagawa; Hidemasa Kitagawa, Toyonaka, both of Japan

[73] Assignee: Matsushita Electric Industrial Co., Ltd., Kadoma, Japan

[21] Appl. No.: 956,366

[22] Filed: Oct. 31, 1978

[30] Foreign Application Priority Data

Apr. 20, 1978 [JP] Japan ............................... 53-47343

[51] Int. Cl.³ .......................... G11B 5/47; G11B 27/36
[52] U.S. Cl. ......................................... 360/66; 360/31
[58] Field of Search .................... 360/66, 31, 27, 25

[56] References Cited

U.S. PATENT DOCUMENTS

| | | | |
|---|---|---|---|
| 3,564,160 | 2/1971 | Temes | 360/66 |
| 4,011,585 | 3/1977 | Sunaga | 360/66 |
| 4,038,692 | 7/1977 | Umeda et al. | 360/66 |
| 4,092,678 | 5/1978 | Nishikawa | 360/66 |

*Primary Examiner*—Vincent P. Canney
*Attorney, Agent, or Firm*—Stevens, Davis, Miller & Mosher

[57] ABSTRACT

A magnetic recording and reproducing apparatus for recording a signal on and reproducing it from a magnetic tape comprises an automatic A.C. bias adjusting device for increasing an A.C. bias current to be superimposed during recording of the signal at a predetermined rate and differentiating the reproduced signal by time to automatically establish an optimum A.C. bias, and a record compensation device for recording and reproducing an adjusting square wave, separating a fundamental frequency component of the square wave from a harmonic component, comprising both components to determine a ratio of them and adjusting a record compensation frequency characteristic in accordance with the ratio.

2 Claims, 12 Drawing Figures

AUTOMATIC TAPE BIAS ADJUSTING AND SIGNAL COMPENSATION RECORDING AND REPRODUCING APPARATUS

The present invention relates to a magnetic recording and reproducing apparatus for recording a signal and reproducing it from a magnetic tape, and it provides a magnetic recording and reproducing apparatus which automatically adjusts an A.C. bias current to an optimum value and automatically compensates for various losses which are produced in accordance with a signal frequency.

FIG. 1 shows a schematic diagram of a prior art tape recorder. When an audio signal is to be recorded on a magnetic tape 1, an input signal is applied from an amplifier 6 to a recording head 3. In this case, an appropriate magnitude of an A.C. bias current must be supplied to the recording head 3. To this end, a portion of an output of an oscillator 9 is applied to an erase head 4 while other portion of the output is supplied through a variable resistor 8 and a coupling capacitor 7 to the recording head 3 as an A.C. bias signal. The recorded signal is transduced to a voltage signal by a reproducing head 2 and the voltage signal is extracted by an amplifier 5. An optimum magnitude of the A.C. bias current usually changes depending on the type of magnetic tape used, the tape speed and the design of a recording and reproducing apparatus. By way of example, a circuit as shown in FIG. 2 has been used, in which several variable resisters $R_1$, $R_2$ and $R_3$ which have been preset to respective optimum values are provided and one of the variable resisters is selected by a switch in accordance with a particular type of magnetic tape used.

Such a preset type magnetic recording and reproducing apparatus has drawbacks in that an optimum bias value cannot always be set to each tape because the preset bias values are determined by the type of tape and an operator cannot identify whether the selected bias value is optimum or not. An approach has been made to adjust the optimum bias current by a tape actually used but no practical solution has been afforded mainly because a change in a reproduced output voltage which corresponds to a change in the A.C. bias current exhibits different characteristic curves by frequency as shown in FIG. 3 and a change near a peak of each curve is relatively gentle so that a peak detection is difficult. Accordingly, in the prior art apparatus, a mechanical drive unit such as a motor is often used as a means for changing the magnitude of A.C. bias in time by rotating an adjusting knob of a potentiometer or variable resistor to change the A.C. bias which is then compared with a reference voltage to detect a peak. In this case, there exist problems in performance and cost and hence in practicability.

The present invention overcomes the drawbacks encountered in the prior art apparatus.

Further objects, features and advantages of the present invention are described with reference to the following accompanying drawings, in which.

Figure 9:
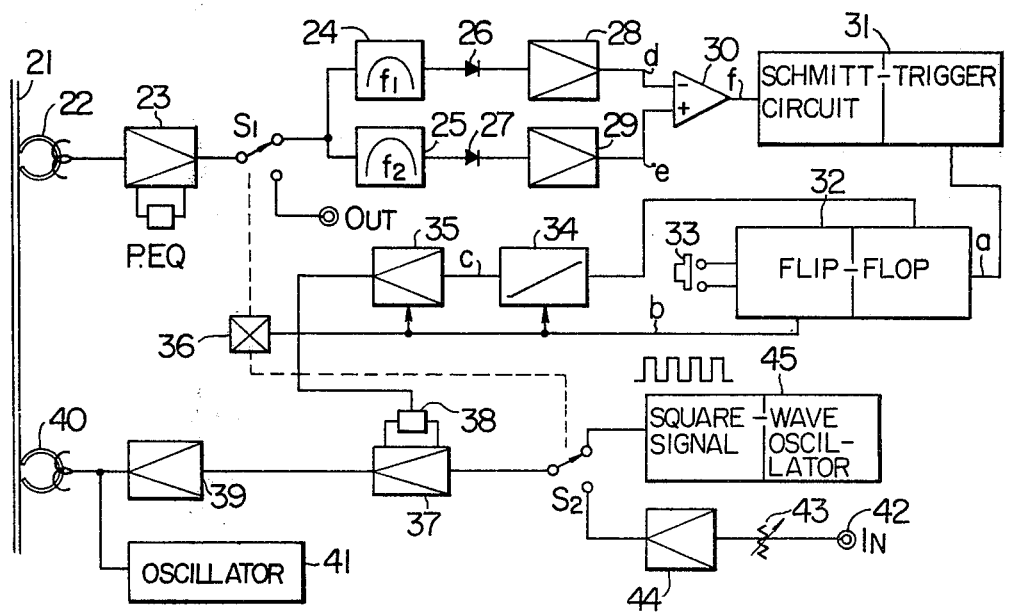
FIG. 9 is another embodiment of a tape recorder according to the present invention.
Figure 10:
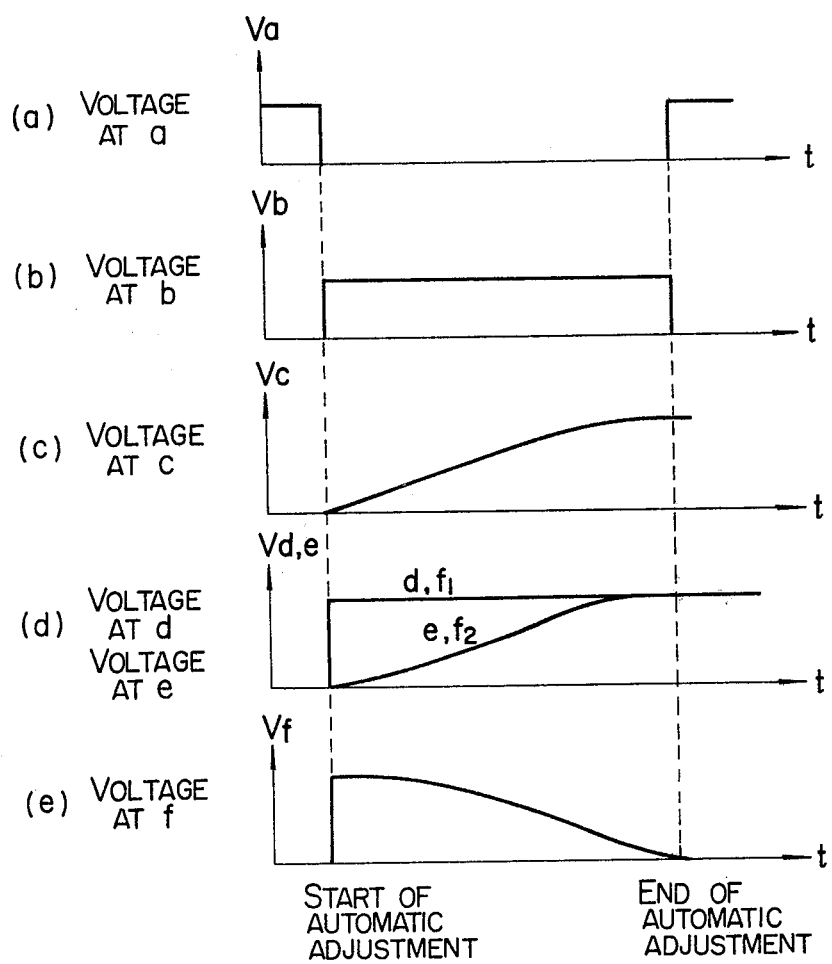
Figure 11:
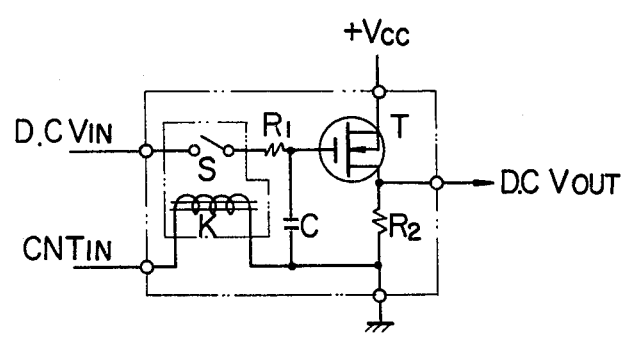

FIG. 10 including a–e is a time chart showing operation of circuit blocks of FIG. 9;

FIG. 11 is a circuit diagram of an analog memory used in FIG. 9; and

Figure 12:
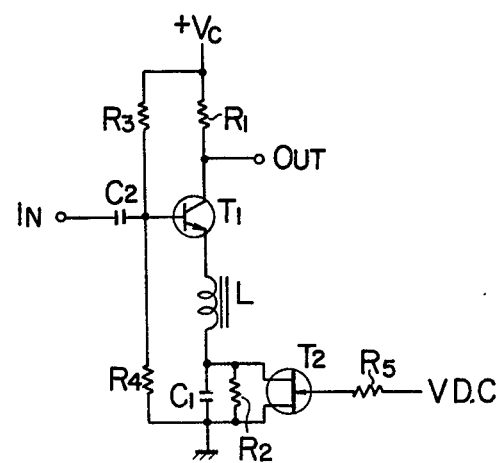

FIG. 12 shows a control circuit for controlling the record compensation circuit used in FIG. 9.

Figure 1:
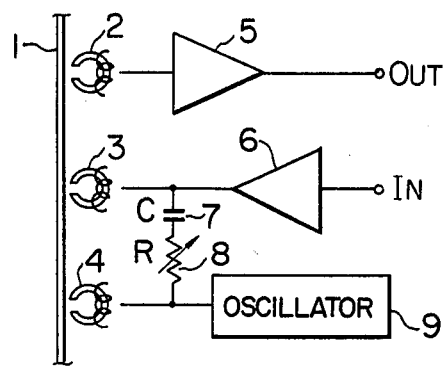
FIG. 1 is a schematic diagram of a conventional tape recorder.
Figure 2:
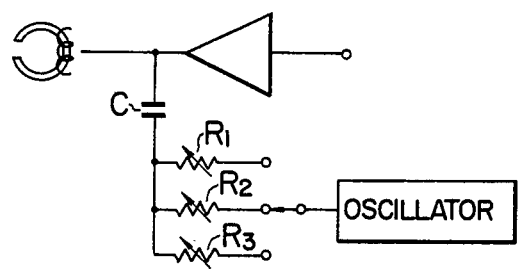
FIG. 2 is an A.C. bias current setting circuit of a conventional type.
Figure 3:
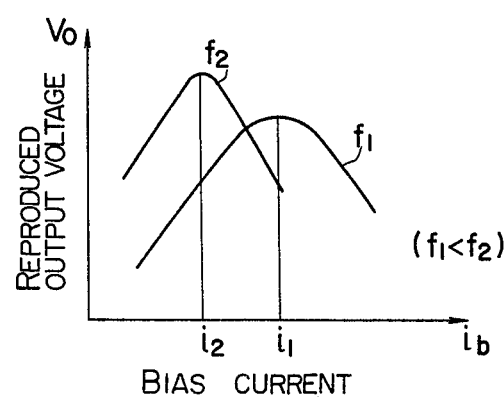
FIG. 3 is a diagram showing bias current versus reproduced output voltage characteristics.

One embodiment of the present invention is now explained with reference to FIG. 4, in which numeral 11 denotes an adjusting reference signal generator which generates a signal $f_s$. Numeral 12 denotes a recording drive amplifier which amplifies the reference signal and an audio signal to drive a recording head 13. Since the signal $f_s$ from the reference signal generator 11 is recorded on a magnetic tape 14, the signal $f_s$ is reproduced by a reproducing head 18 and it is amplified by a pre-amplifier 19, thence an output of the pre-amplifier 19 is converted to a D.C. level by a rectifier 20. A change of the reproduced output voltage when the A.C. bias current is changed is generally shown in FIG. 3. As shown, as the bias current $i_b$ increases, the reproduced output voltage $V_o$ continuously increases, but after the bias current has reached a peak point, the reproduced output voltage decreases. Although the characteristic curves change as shown with the frequency of the recorded signal, a trend of exhibiting a peak is common to all curves. The magnitude of the bias current at which the peak is exhibited somewhat changes depending on the type of tape and the recording and reproducing frequency characteristic also changes depending on that bias current. Accordingly, it should be automatically adjusted.

Figure 4:
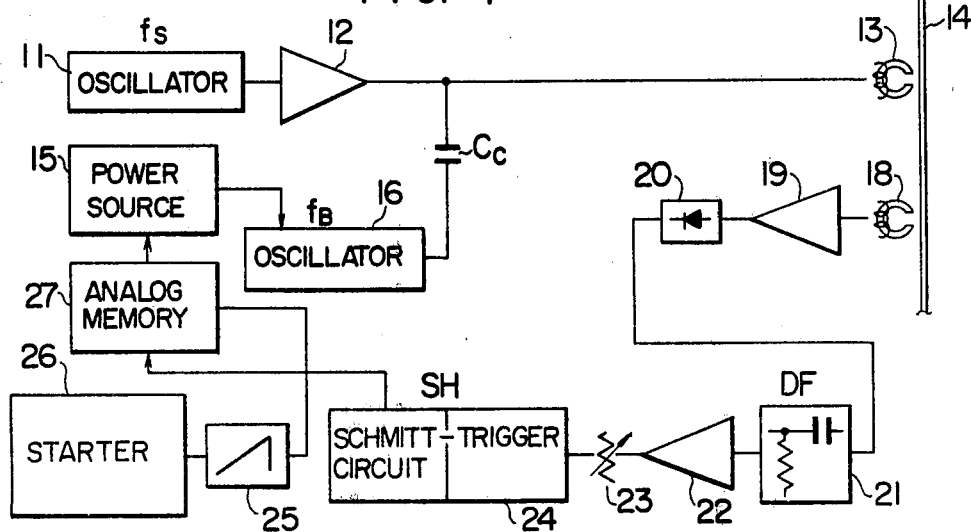
FIG. 4 is a circuit diagram of one embodiment of the present invention.

To this end, according to the present invention, means for changing the bias current with time is provided, which comprises, as shown in FIG. 4, a ramp wave generator 25, an analog voltage memory 27, a bias oscillator driving power source 15 and a bias oscillator 16. When a starter 26 is actuated, the ramp wave generator 25 generates a voltage which rises with time. This voltage is supplied to the analog voltage memory 27 as an input voltage thereto. An output voltage from the analog voltage memory 27 changes a power supply voltage from the power source 15 with time and an output voltage of the bias oscillator 16 also changes correspondingly.

Figure 5:
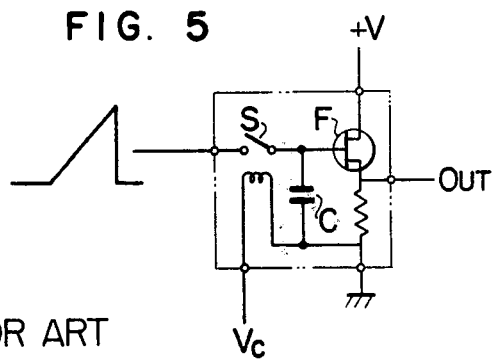
FIG. 5 shows a circuit of an analog voltage memory used in FIG. 4.

When a constant signal is supplied to the recording head 13, the reproduced output voltage (output voltage from the pre-amplifier 19) changes in accordance with the curve shown in FIG. 3. Therefore, an output voltage from a differentiation circuit 21 is zero at the peak of the curve. Thus, the change of the output voltage is useful for peak detection. That is, a Schmitt trigger circuit 24 may be triggered at the time when an output voltage of a D.C. amplifier 22 becomes zero. A level controller 23 functions to determine a width of dead band or non-response band for reproduced level. When the Schmitt trigger circuit 24 is triggered, the input to the analog voltage memory 27 is blocked so that the output voltage of the analog voltage memory 27 is fixed to an analog voltage stored at that moment. And the change of the output voltage of the power source 15 is also stopped to fix the same thereat. The memory 27 is designed such that it maintains the stored voltage over an extended period even after a power supply thereto is turned off. An internal structure of the memory is shown in FIG. 5, in which a D.C. voltage across a capacitor C is stored and it is read out through a field effect type transistor F.

As described hereinabove, according to the present invention, the change of the reproduced output voltage is detected by the differentiation circuit and the A.C. bias current at the time of peak detection is stored and maintained in the analog voltage memory. Through this operation, the setting of the A.C. bias current, which has been troublesome to set in the prior art apparatus, is automatically adjusted to comply with the tape currently loaded in the tape recorder. Accordingly, an electromagnetic transducing ability inherent to the tape recorder can be always fully utilized at an optimum condition. Furthermore, even if the characteristics of the components of the tape recorder, particularly the head change, an optimum condition can always be maintained.

The record compensation unit of the magnetic recording and reproducing apparatus of the present invention is further explained with reference to another type embodiment.

Figure 6:
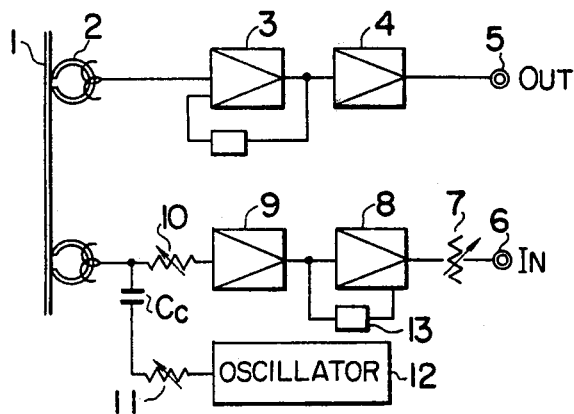
FIG. 6 is a schematic diagram of another type conventional tape recorder.

FIG. 6 shows a schematic diagram of a prior art tape recorder. In FIG. 6, numeral 1 denotes a magnetic tape, 2 denotes a reproducing head, 3 denotes a playback equalizer amplifier, 4 denotes an output amplifier, 5 denotes an output terminal, 6 denotes an input terminal, 7 denotes an input level adjusting variable resistor, 8 denotes a recording current compensation amplifier 9, denotes a recording head driving amplifier, 10 denotes a recording current adjusting means, 11 denotes an A.C. bias current adjusting means, 12 denotes an A.C. bias oscillator and 13 denotes a record compensation circuit adjusting component.

Figure 7:
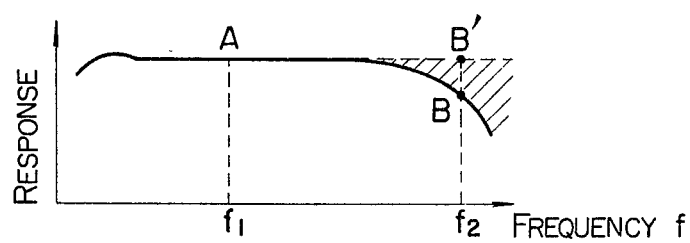
FIG. 7 shows a frequency characteristic of a conventional tape recorder without compensation of high frequency region.
Figure 8:
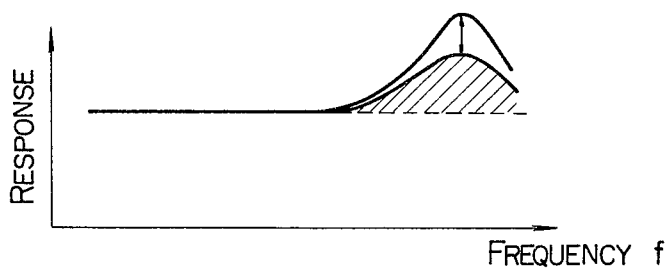
FIG. 8 shows a frequency characteristic to be partially compensated.

In general, when the magnetic recording and reproducing apparatus records a signal under a constant current recording mode, it cannot attain an ideal recording and reproducing characteristic for various reasons but it produces more losses during recording and reproducing as the frequency of the signal to be recorded or reproduced rises. Thus, it cannot achieve high fidelity recording and reproduction. In a conventional tape recorder, a compensation circuit, that is, a high frequency component enhancing circuit for compensating for the various losses is usually inserted in the amplifier for amplifying the input signal, as shown in FIG. 6. FIG. 7 shows an example of a recording and reproducing frequency characteristic of an uncompensated tape recorder. It shows a trend that the loss increases as the frequency f rises. As an example of a circuit for compensating for the illustrated characteristic, an amplifier which shows a characteristic in which a response locally rises at a high frequency, as shown in FIG. 8, may be needed. The amount of compensation can be controlled by adjusting peaking in the frequency characteristic, as shown in FIG. 8 or by other method. The hatched area in the frequency characteristic shown in FIG. 8 represents the amount of compensation. In the recording characteristic compensation circuit of the conventional tape recorder, this amount of compensation is used to compensate for the deterioration of the characteristic shown by the hatched area in FIG. 7 to attain a high fidelity recording and reproducing characteristic.

Of the various losses described above, a self-demagnetization loss etc., occupies a large part on the recording side. Since this loss tends to increase with the frequency (recording wavelength) to be recorded, it is necessary to increase the recording current in correspondence to the amount of loss.

In the conventional tape recorder, this is usually compensated by measuring a flat characteristic using an adjustment tape on the basis of reproducing station and then recording a signal under a constant current recording mode and compensating for the loss of frequency characteristic by adjusting the recording current. More particularly, a frequency $f_1$ shown in FIG. 7 which lies in a middle frequency band, which is easy to provide a relatively ideal frequency characteristic, is selected and a recording and reproducing level A at that frequency is compared with a recording and reproducing level B at a selected frequency $f_2$ which lies in a high frequency band. If $A > B$, the recording current is increased to a point where a level B' which is approximately equal to A is attained, and when the level B' ($\approx A$) is attained, the adjustment operation is terminated.

This adjustment process requires an oscillator which produces two frequencies $f_1$ and $f_2$, a filter for extracting or separating the two recorded signals $f_1$ and $f_2$, a level meter for monitoring the recording and reproducing level, and means for continuously monitoring the level to stop the increase or decrease of the recording current when both levels are equal.

Since the above adjustment process needs measuring instruments as well as adjusting time, it has not yet been automated. Thus, in the prior art tape recorder, a preset system has been used, in which tapes are classified in accordance with the analogy and the bias and the equalizer characteristic are preset for each class so that an operator can select an appropriate one of preset bias and equalizer characteristic by a switch.

As the quality of the tape is improved as the technology develops, and the number of types of tape also increases, the recording and reproducing frequency characteristic resulting from the preset type compensation is not always satisfactory because the preset type compensation can only provide average compensation.

The present invention overcomes the drawback encountered in the prior art apparatus.

FIG. 9 shows a configuration of one embodiment of the tape recorder of the present invention. In FIG. 9, numeral 21 denotes a magnetic tape, 22 denotes a reproducing head for reproducing a signal recorded on the magnetic tape 21, 23 denotes a playback equalizer amplifier, 24 denotes a band-pass filter for extracting a desired frequency component, 25 denotes a band-pass filter similar to the band-pass filter 24, numerals 26 and 27 denote rectifiers, and 28 and 29 denote amplifiers for amplifying the rectified D.C. components. Output levels of the amplifiers 28 and 29 correspond to the recording and reproducing levels at the frequencies $f_1$ and $f_2$, respectively. Numeral 30 denotes a voltage comparator, and 31 denotes a Schmitt trigger circuit, which is triggered to produce a pulse voltage when the output level of the voltage comparator 30 falls below a predetermined level. A flip-flop circuit 32 is flipped by the pulse voltage to produce an output voltage. Numeral 34 denotes a sweep voltage generator. When a start switch 33 is actuated, the flip-flop circuit 32 is reset to enable the sweep voltage generator 34 and a D.C. voltage generator (analog memory) 35 and to drive a relay 36. When the relay 36 is energized, switches $S_1$ and $S_2$ are switched (to close their contacts as indicated in FIG. 9) so that all of the circuit blocks are brought into an automatic recording compensation adjustment mode. When the operation of the automatic recording compensation adjusting device has been completed, the entire circuit is reset to the normal recording and reproducing mode (the switches $S_1$ and $S_2$ close their contacts on the opposite side to that indicated in FIG. 9). Numeral 37 denotes a record compensation circuit and 38 denotes a component for controlling a compensation characteristic. The component 38 responds to the D.C. output voltage from the D.C. voltage generator 35 to change its impedance for changing the compensation characteristic.

A signal derived from the record compensation circuit 37 is fed to a recording drive circuit 39 which drives a recording head 40 to magnetize the magnetic tape 21. Numeral 41 denotes an R.F. bias signal generator, an output signal of which is superimposed on the signal to be recorded to supply a high frequency current to the recording head 40. Numeral 42 denotes an input terminal for receiving the usual recording signal, 43 a level adjuster, and 44 an amplifier.

In the present invention, a square wave signal from a square wave signal oscillator 45 shown in FIG. 9 is utilized as an automatic adjustment signal. The square wave oscillator may be an astable multivibrator. It is well known that the square wave includes a repetition frequency (fundamental frequency) component as well as other frequency components. It is, therefore, most appropriate for use as the adjustment signal. Furthermore, the square wave signal can be generated by a highly efficient pulse generator.

Referring to FIGS. 11 and 12, an embodiment of a variable frequency characteristic circuit and the operation thereof are explained.

FIG. 11 shows a construction of the D.C. voltage generator (analogy memory) 35 shown in FIG. 9. In FIG. 11, T denotes a field effect transistor, S denotes a reed switch, K denotes a drive coil for the reed switch, C denotes a capacitor for storing a voltage, and $R_1$ and $R_2$ denote resistors. In the circuit of FIG. 11, when a voltage is applied to the drive coil K to close the switch S, a voltage representative of the input voltage is charged in the capacitor C through the resistor $R_1$. An output voltage is taken out to an external circuit through the transistor T and the resitor $R_2$. When the voltage applied to the reed switch drive coil K is terminated, the switch S is opened and the voltage charged in the capacitor C can be held over an extended period (longer than 1000 hours). This voltage does not change even after the supply voltage $V_{cc}$ is turned off. Thus, when this circuit is incorporated in the tape recorder, one can use the tape recorder for a long period of time without requiring readjustment once the adjusting voltage is stored.

FIG. 12 shows one concrete example of the record compensation circuit 37 and the circuit 38 for controlling the same using the output voltage from the circuit of FIG. 11. In FIG. 12, $T_1$ denotes an amplifying transistor, $T_2$ denotes a variable impedance controlling transistor, $R_1$–$R_5$ denote resistors, $C_1$ denotes a resonance capacitor, $C_2$ denotes a coupling capacitor and L denotes a resonance coil. It is well known that an amplification factor changes with an emitter impedance of a transistor, which impedance provides a current feedback. Accordingly, if this impedance exhibits a frequency characteristic, the amplification factor changes correspondingly. In the embodiment shown in FIG. 12, the impedance is minimum and hence the amplification factor is maximum at a series resonance frequency $$f = \frac{1}{2\pi \sqrt{LC_1}}$$

of the coil L and the capacitor $C_1$. The series resonance impedance is ideally zero and the amplification factor of the amplifier circuit which includes the series resonance circuit in the emitter circuit is ideally infinite, but when the coil L has a D.C. resistance, the capacitor $C_1$ has a specific resistance and a loss and a resistance $R_2$ exists across the capacitor $C_1$ as shown in FIG. 12, the impedance does not assume zero. When the emitter circuit is connected in series with the coil L which is connected in series with the parallel circuit of the capacitor $C_1$ and the resistance $R_2$ as shown in FIG. 12, a resultant impedance $\dot{Z}$ is represented by;

$$\dot{Z} = \dot{\omega}L + \frac{1}{1/R_2 + \dot{\omega}C_1} \tag{1}$$

Thus, the characteristic of the resonance circuit changes with the resistance $R_2$. Accordingly, by connecting the transistor $T_2$ in parallel with the resistance $R_2$ as shown in FIG. 12 and controlling the conductivity (impedance) of the transistor $T_2$, the resonance characteristic can be changed to obtain the compensation characteristic, that is, the characteristics shown in FIG. 8.

FIG. 10 shows a time chart for the operation of the circuit of FIG. 9.

In FIG. 9, when the start switch 33 is depressed, the entire circuit is brought into the adjusting mode and the D.C. voltage from the sweep voltage generator 34 starts to rise gradually. In response to this voltage, the D.C. voltage generator 35 generates a gradually rising D.C. voltage which causes the impedance of the component 38 of the record compensation circuit 37 to change so that the amount of record compensation increases as the voltage rises. The input voltage level to the voltage comparator 30, i.e., the recording and reproducing level at the low frequency $f_1$ does not substantially change but the recording and reproducing level at the high frequency $f_2$ increases as the amount of compensation increases, as shown in FIG. 10d and it finally reaches the same level as the level at the low frequency $f_1$, as shown in FIG. 10d.

For a time, the output level of the voltage comparator 30 shown in FIG. 9 gradually falls as shown in FIG. 10e and when it falls below a predetermined level, the Schmitt Trigger circuit 31 is triggered and the adjustment is completed.

Upon the completion of the adjustment, the entire circuit is reset to the normal recording and reproducing mode. Since the control input signal to the D.C. voltage generator (analog memory) 35 is terminated, the generator 35 holds the voltage stored at that moment over an extended period of time. That is, the amount of record compensation for the tested magnetic tape is stored and held over an extended period of time.

As described hereinabove, according to the present invention, procedures required in the prior art apparatus, that is, to determine the class of the tape by catalogue or the like, to find out an appropriate record compensation position on the tape recorder and to select that position by a switch, are eliminated, and inconveniences caused by improper operation due to improper classification of the tape or other misoperation are also eliminated. Furthermore, the apparatus can be constructed by simple circuits.

What is claimed is:

1. A magnetic recording and reproducing apparatus comprising:
    first means for generating a reference signal;
    second means for generating an AC bias circuit;
    third means for producing a recorded signal on a magnetic tape consisting of the reference signal and AC bias current in superposed relation to each other;
    fourth means for changing the magnitude of the AC bias current with time at a predetermined rate;
    fifth means for reproducing the recorded signal from the tape;
    sixth means for differentiating the reproduced signal to produces a substantially zero level differentiated output signal when the reproduced signal reaches a peak level;
    seventh means for controlling said fourth means to stop the change of magnitude of the AC bias current in response to detection of said substantially zero level differentiated output signal; and,
    eighth means for storing and holding the magnitude of the AC bias current when the magnitude change of the latter has stopped, whereby an optimum AC bias current is selected for a magnetic tape used in the recording and reproducing apparatus.

2. A magnetic recording and reproducing apparatus according to claim 1, wherein said means for storing and holding the A.C. bias current includes an analog voltage memory.

* * * * *